March 29, 1960   S. KOWALSKI ET AL   2,930,404
THREE-WAY POPPET-VALVE CONSTRUCTION FOR PLUG-TYPE VALVE
Filed Jan. 16, 1957
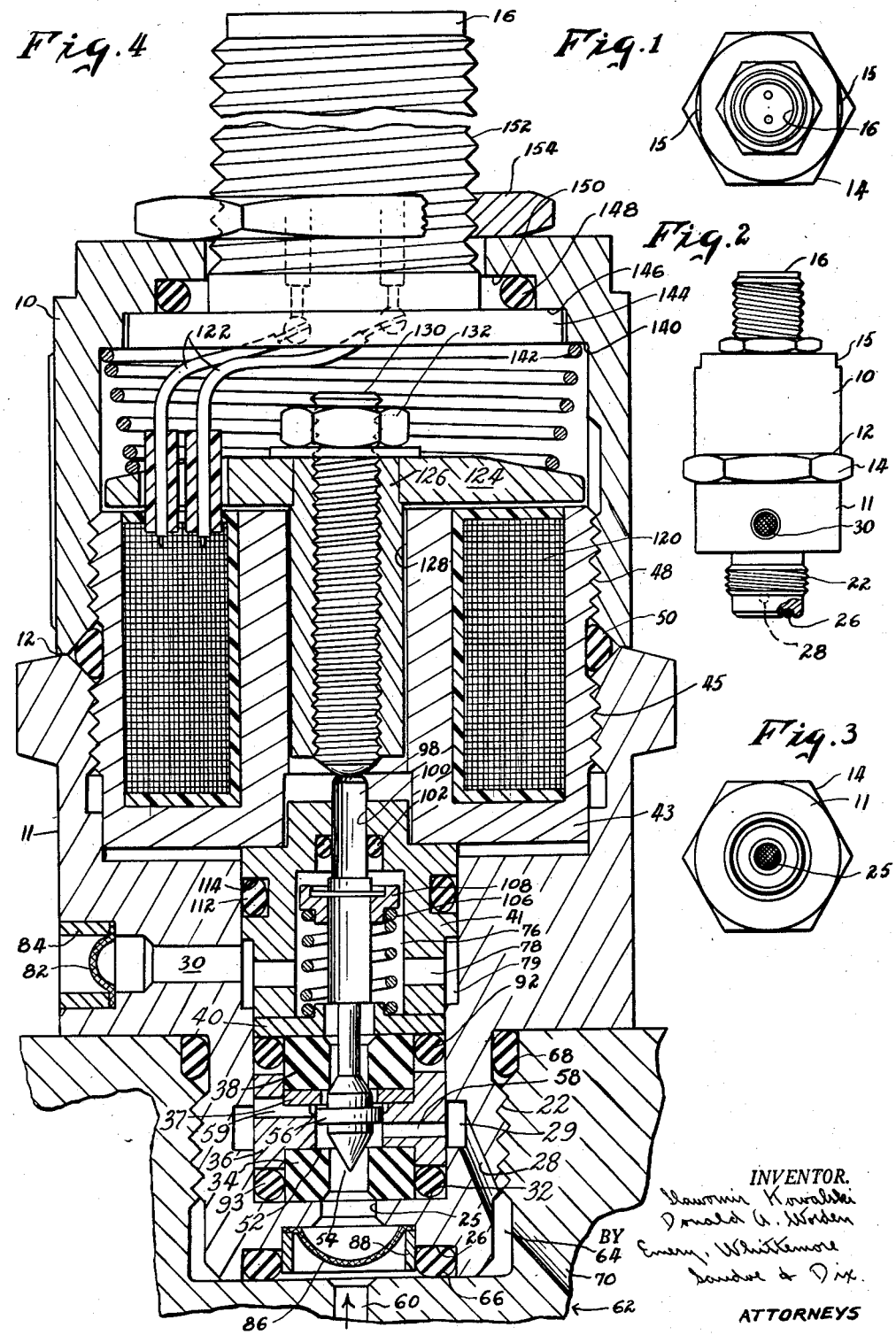
INVENTOR.
Slawomir Kowalski
Donald G. Worden
BY Emery, Whittemore,
Dowdle & Dix.
ATTORNEYS United States Patent Office 2,930,404
Patented Mar. 29, 1960

2,930,404

THREE-WAY POPPET-VALVE CONSTRUCTION FOR PLUG-TYPE VALVE

Slawomir Kowalski, Rockaway, and Donald A. Worden, Pompton Plains, N.J., assignors to Marotta Valve Corporation, Boonton, N.J., a corporation of New Jersey Application January 16, 1957, Serial No. 634,553

6 Claims. (Cl. 137—625.25)

This invention relates to valves and more especially to a three way position poppet valve constructed for magnetic actuation.

It is an object of the invention to provide an improved poppet valve of compact construction and with a minimum of joints which must be sealed against leakage. Another object of the invention is to provide a compact and efficient valve assembly for connection with a housing having fluid passages therein through which the flow is to be controlled by the connected valve assembly.

Another feature of the invention relates to an improved construction of the valve assembly with all internal parts, including the magnetic actuator, sealed against dirt, moisture, or other extraneous matter from outside the valve assembly.

Other objects, features and advantages of the invention will appear or be pointed out as the description proceeds.

In the drawing, forming a part hereof, in which like reference characters indicate corresponding parts in all the views;

Figure 1 is a top view of the valve assembly of this invention;

Figure 2 is a side elevation of the valve assembly shown in Figure 1;

Figure 3 is an end view of the bottom of the valve assembly shown in Figures 1 and 2; and Figure 4 is a greatly enlarged sectional view, partly broken away, through the valve assembly shown in Figures 1–3, and with the valve screwed into a recess with which the fluid flow conduits communicate.

The valve assembly shown in the drawing includes a housing comprising an upper shell 10 and a lower shell 11 joined together at a seam 12. These shells are connected by screw threads and provided with packing as will be explained in connection with Figure 4. The lower shell 11 has a hexagonal portion 14 for receiving a tool for use both in assembly of the valve structure and for connecting the valve assembly with the housing structure with which it is intended to be used. There are flats 15 on the upper shell 10 for holding that shell with a wrench or other tool.

At the top of the upper shell 10 there is a receptacle 16 for connection with a drop cord or other power supply for supplying energy to the magnetic actuator of the valve whenever the valve is to be operated from its normal position.

The bottom portion of the lower shell 11 is of reduced diameter and has threads 22 by which it is to be connected to the housing which contains the fluid passages in which flow is to be controlled.

In the end face of the reduced diameter portion of the lower shell 11 there is a central passage 25 opening through the end of the shell and there is an annular recess 26 for holding a packing ring. Another passage 28 opens through the wall of the lower shell near the end of the threads 22. At the upper end of the passage 28 there is an annular groove 29 (Figure 4) in the inside wall of the lower shell. In the intended operation of the valve assembly, the passage 25 is the fluid inlet passage and the passage 28 is the outlet passage. There is another passage 30 opening through the wall of the shell 11 where the shell is of large diameter. This other passage 30 is a vent for escape of fluid from the valve assembly.

Figure 4 shows the interior of the valve assembly. The passage 25 is of substantially less diameter than the shell 11, and the reduced diameter portion of the shell 11 has a cylindrical inside wall of substantially larger diameter than the passage 25 so that a shoulder or annular end wall 32 is provided around the perimeter of the passage 25. This end wall forms one end of a valve chamber.

A valve seat assembly 34 is held against the end wall 32 by a spacer 36 which is in turn clamped against the valve seat assembly 34 by an abutment washer 37 and a seat 38 on the other side of the spacer 36. A retainer 40 is held in place by a bushing 41; and this bushing 41 is pressed against the retainer 40 by an iron core 43. The core 43 has a portion with threads 45 which screws into complementary threads within the lower shell 11 of the valve casing.

The upper shell 10 also has internal threads and these screw over complementary threads 48 on the iron core 43 above the seam 12. An O-ring 50 surrounds the iron core 43 between the threads 45 and 48; and this O-ring 50 is clamped by tapered surfaces of the shells 10 and 11 to provide a seal at the seam 12.

A longitudinal opening through the spacer 36 provides a valve chamber 52. There are aligned passages through the valve seats 34 and 38 at opposite ends of the valve chamber 52. A valve element 54 is movable into and out of contact with the valve seat 34.

When the valve element 54 is in open position, and operating with fluid at low or moderate temperature and pressure, it occupies the position shown in Figure 4 with the lower face of the valve element clear of the seat 34, and the upper face of the valve element in contact with the seat 38.

There is a collar 56 on the valve element 54, and this collar is spaced from the washer 37, except when the apparatus is operated at high pressure or high temperature or both.

High pressure causes the valve element 54 to distort the seat 38, and such distortion is limited by contact of the metal collar 56 with the metal washer 37 to provide a positive stop against further movement of the valve element 54 after a predetermined permissible distortion of the seat 38. If the apparatus is operated at high temperature, then the seat 38 is softer, and less pressure will cause the maximum permissible distortion and bring the collar 56 into contact with the washer 37.

In addition to the actual protection of the seat 38, there are other important reasons for providing this metal-to-metal limit stop for the valve element 54, the description of the magnetic operating mechanism. A metal-to-metal stop for limiting movement of the valve element 54 in the direction of the valve seat 34 is provided by cooperating parts of the magnetic operating means, and as will be explained in the description of that mechanism.

The valve chamber 52 communicates with the passage 28 through radial passages 58 and 59 opening through the spacer 36. When the valve element 54 is in its open position, as shown in Figure 4, fluid flows from a supply passage 60 in a housing 62, and into the valve assembly housing through the passage 25. The fluid flows past the open valve element 54 and outwardly through the radial passage 58 and passage 28 through a peripheral portion 64 of the recess into which the valve assembly is screwed.

This peripheral portion 64 is separated from the supply passage 60 by a seal consisting of an O-ring 66 located in the recess 26 in the bottom face of the valve assembly housing. Another O-ring 68 seals the construction against leakage of fluid upwardly along the threads 25 and outwardly between the top face of the housing 62 and the confronting face of the valve assembly shell 11. From the peripheral portion 64 of the recess, the fluid flows through a passage 70 in the housing 62.

When the valve element 54 is in contact with the valve seat 34, the fluid can exhaust from the passage 70 through the periphal portion 64 of the recess and through the passage 28, groove 29, passage 59, and behind the valve element 54 into the opening through the washer 37 and seat 38, and thence into a chamber 76 in the bushing 41. From this chamber 76, fluid flows through radial passages 78 into an annular groove 79 which communicates with the passage 30 opening through the wall of the shell 11.

From the description thus far it will be apparent that the movement of the valve element 54 toward and from the valve seats 34 and 38 controls the flow of fluid from a supply passage 60 to another passage 70 in the housing 62, and from the passage 70 to the exhaust or vent opening 30. If at any time the valve assembly fails to operate properly, the entire assembly can be unscrewed from the recess in the housing 62 and another valve assembly can be substituted.

A screen 82 is located in a counterbore in the outer end of the passage 30 and this screen 82 is held in place by a clamping ring 84. There is a similar screen 86 and a counterbore at the end of the passage 25, and the screen 86 is held in place by a clamping ring 88.

The valve seat 34 and seat 38 are preferably made of plastic material, such as nylon.

The spacer 36 and the stop washer 37 are preferably made of metal, such as aluminum alloy or stainless steel. The valve chamber 52 is sealed against leakage by O-rings 92 and 93.

The valve element 54 has a stem 98 which slides in a bearing 100 at one end of the bushing 41. An O-ring 102 prevents leakage of fluid along the stem 98 and through the bearing 100. The valve stem 98 is urged upwardly, in Figure 4, by a spring 106 compressed between the retainer 40 and a collar 108 secured to the valve stem 98.

In addition to the O-ring 102, which prevents leakage of fluid along the valve stem 98, the upper part of the valve assembly housing is protected from leakage of fluid by another O-ring 112. This O-ring 112 is located in an annular groove 114 in the outside of the bushing 41, and it contacts with the face of the counterbore in which the bushing 41 is located.

The valve stem 98 is moved downwardly, to bring the valve element 58 into contact with its seat 34, against the tension of the spring 106, by a magnetic actuator. This magnetic actuator includes windings 120 on the iron core 43. These windings are connected with the receptacle 16 by conductors 122. The magnetic actuator includes an armature 124 secured to the upper end of a sleeve 126 which slides freely in a longitudinal opening 128 of the iron core 43.

The inside surface of the sleeve 126 is threaded to receive an adjusting screw 130. The lower end of this adjusting screw 130 contacts with the end of the valve stems 48, and the adjusting screw can be locked in any adjusted position by a lock nut 132.

The screw 130 is adjusted to such a position that the armature 124 comes into contact with the confronting face of the iron core 43 when the valve element 54 is against the valve seat 34 with the desired degree of pressure. The fact that the seat 34 is made of plastic material permits some yielding of the seat under pressure from the tapered face of the valve element 54, and the contact of the armature 124 with the face of the iron core 43 provides a positive metal-to-metal stop for limiting the movement of the valve element 54 against the valve seat 34 and a consequent limiting of the pressure of the valve element against the valve seat and the resulting distortion of the valve seat.

This limiting of the maximum movement of the valve element in one direction by striking of the armature 124 against the iron core 43 and in the other direction by striking of the collar 56 against the abutment washer 37 prevents excessive variations in the force required to operate the valve element. Thrusting of the sloping faces of the valve element deeper into the passages through the seats 34 and 38 increases the cross-section of the passages at the valve element and increases the effective area of the valve element exposed to the pressure differential between the pressure in the valve chamber 52 and that in the fluid passage closed by the valve element.

In the case of the contact of the valve element 54 with the upper seat 38, the metal-to-metal stop provided by the collar 56 and the abutment washer 37, has another important advantage in that it prevents excessive air gaps between the armature 124 and the face of the iron core 43. The force of a magnet decreases rapidly with increase in the air gap, and without the abutment stop of this invention, the valve would not have the same high speed movement that the invention now attains.

Both the valve seat 34 and the sleeve 38 extend into counterbores in the metal spacer 36 and this provides a reinforcing of these plastic parts against radial spreading. One of the advantages of the valve shown in the drawing is its quick operation. This results in part from the fact that the limiting movement of the valve element 34 in both directions is determined by metal-to-metal contacts which serve as stops; and the construction eliminates the squeezing of O-rings or other packing at either end of the stroke with resulting drag and slower operating response.

In order to prevent vibration of the magnetic actuator, there is a spring 140 compressed between the armature 124 and a shoulder 142 at the upper part of the upper shell 10 of the valve assembly. The receptacle 16 includes a flange 144 which is held against another shoulder 146 of the upper shell 10, and there is an O-ring 148 compressed between the flange 144 and a third shoulder 150 of the upper shell 10.

The receptacle 16 has threads 152 for receiving a nut 154. This nut clamps against the top face of the shell 10 and holds the flange 144 against the shoulder 146 with the O-ring 148 under slight pressure. This O-ring 148 prevents dirt, moisture, and fumes from entering the casing 10 along the threads 152 and around the lower edges of the receptacle 16.

The prefered embodiment of the invention has been illustrated and described but changes and modifications can be made and some features of the invention can be used in different combinations without departing from the invention as defined in the claims.

What is claimed is:

1. A fluid flow control valve comprising a housing having a reduced-diameter portion at one end, a valve chamber in the housing and at least partly in the reduced-diameter portion, a poppet valve element within the housing, a seat at one end of the valve chamber, the valve element having faces on opposite sides thereof for contact with the seat and abutment at opposite ends of the stroke of said valve element, the housing having a fluid flow passage opening through the end face of the reduced-diameter portion of the housing and communicating with the valve chamber beyond the valve seat, another fluid flow passage opening through a side of the reduced-diameter portion of the housing and communicating with the valve chamber at a location between the valve seat and said abutment, an extension of the valve element beyond the abutment, and a magnetic actuator within the housing and in alignment with the extension of the valve element, the magnetic actuator including a core and an armature movable toward and from an end face of the core, the armature being attracted toward the core when the actuator is energized, and in which the armature of the magnetic actuator contacts with the core to stop further movement of the valve element when it has closed against the seat under a predetermined pressure, and the valve element contacts with said abutment to provide a fixed and positive stop limiting the movement of the valve element in its movement away from the seat, and in which the housing comprises two shells with confronting annular faces that contact with one another, sealing means for preventing leakage of fluid between said annular faces, threads on the inside of each of the shells in the region of the annular faces, the core of the magnetic actuator having threads on its outside surface and over which the shells are screwed to bring them together, a sleeve extending through the core, a plunger connected to the armature and movable back and forth within the sleeve, the plunger carrying a contact which operates the valve element, and means for adjusting the length of the plunger to control the position of the valve element when the armature is in contact with the core.

2. A three-way poppet valve comprising a housing having a chamber therein, an end wall at one end of the chamber, a first valve seat in the chamber and held against axial displacement in one direction by pressure against the end wall, a second valve seat in the chamber in axial alignment with the first valve seat, a spacer between the valve seats holding them accurately spaced from one another in an axial direction, a retainer clamping the second valve seat and first valve seat together in an assembly and clamping the assembly against said end wall, a valve element between the seats and having faces on its opposite sides confronting areas of the respective seats, the faces of the valve element being axially spaced from one another by a distance less than the axial spacing of the seat areas, the chamber having a passage communicating with the chamber between the valve seats and other passages beyond said areas of the valve seats, and actuating means for the valve element, and in which the seats are of soft material that is distorted by the force of the actuating means, and there are abutment surfaces other than the seats and valve element faces for limiting the travel of the valve element and the resulting distortion of the seats.

3. A three-way poppet valve comprising a housing having a chamber therein, an end wall at one end of the chamber, a first valve seat in the chamber and held against axial displacement in one direction by pressure against the end wall, a second valve seat in the chamber in axial alignment with the first valve seat, a spacer between the valve seats holding them accurately spaced from one another in an axial direction, a retainer clamping the second valve seat and first valve seat together in an assembly and clamping the assembly against said end wall, a valve element between the seats and having faces on its opposite sides confronting areas of the respective seats, the faces of the valve element being axially spaced from one another by a distance less than the axial spacing of the seat areas, the chamber having a passage communicating with the chamber between the valve seats and other passages beyond said areas of the valve seats, and actuating means for the valve element, and in which the seats are of soft material that is distorted by the force of the actuating means, and there are abutment surfaces other than the seats and valve element faces for limiting the travel of the valve element and the resulting distortion of the seats, and in which the abutment surfaces other than the seats and valve element faces are made of metal.

4. A three-way poppet valve comprising a housing having a chamber therein, an end wall at one end of the chamber, a first valve seat in the chamber and held against axial displacement in one direction by pressure against the end wall, a second valve seat in the chamber in axial alignment with the first valve seat, a spacer between the valve seats holding them accurately spaced from one another in an axial direction, a retainer clamping the second valve seat and first valve seat together in an assembly and clamping the assembly against said end wall, a valve element between the seats and having faces on its opposite sides confronting areas of the respective seats, the faces of the valve element being axially spaced from one another by a distance less than the axial spacing of the seat areas, the chamber having a passage communicating with the chamber between the valve seats and other passages beyond said areas of the valve seats, and actuating means for the valve element, and in which the actuating means include a spring for moving the valve element in one direction and an electro-magnetic actuator for moving the valve element in the other direction, and in which the abutment surfaces for limiting the travel of the valve element in the direction in which it is moved by the spring include an annular metal shoulder in front of one of the valve seats and a complementary shoulder on the valve element and the abutment surfaces for limiting the travel of the valve element in the other direction include complementary contact surfaces of the electro-magnetic actuator.

5. A three-way poppet valve described in claim 4, and in which the electro-magnetic actuator has a core and an armature that is attracted to the core and that contacts with a face of the core at one end of the armature stroke, and there are motion-transmitting means between the armature and the valve element, and means for adjusting the length of said motion-transmitting means.

6. A fluid control valve comprising a housing having a circular and reduced diameter portion at one end with threads on the outside thereof for screwing into a socket, an axial bore through the bottom end face of the reduced diameter portion providing a passage for fluid, said bore having a counterbore providing at least a portion of a valve chamber in the housing with a shoulder at the bottom of the counterbore, a group of different annular elements within the counterbore and some of which are of different material from others, said elements including a seat at one end of the valve chamber, an abutment at the other end of the valve chamber, a spacer between the seat and abutment, the valve element having faces on opposite sides thereof for contact with the seat and abutment at opposite ends of the stroke of said valve element, the bore through the end face of the reduced diameter portion of the housing communicating with the valve chamber below the valve seat, another fluid flow passage opening through the circumferential surface of the side of the reduced diameter portion of the housing adjacent to said threads and communicating with the valve chamber at a location between the valve seat and said abutment, an extension of the valve element beyond the abutment, a magnetic actuator within the housing above the reduced diameter portion and in alignment with the extension of the valve element, the magnetic actuator including a core and an armature movable toward and from an end face of the core, the armature being attracted toward the core when the actuator is energized, the armature of the magnetic actuator contacting with the core to stop further movement of the valve element when it has closed against the seat under a predetermined pressure, and the valve element contacting with said abutment to provide a fixed and positive stop limiting the movement of the valve element in its movement away from the seat, the valve element having a stem extending through a center opening in said abutment and into the magnetic actuator, a second valve seat around said center opening, the valve element closing against said second valve seat to seal the end of the valve chamber, remote from the first valve seat, when the valve element is in open position, with respect to the first valve seat, the second valve seat being in position to be contacted by the valve element before the valve element touches the abutment, and the second valve seat being made of material that yields within its elastic limit by the time the valve element comes against said abutment to stop further yielding of the seat.

References Cited in the file of this patent

UNITED STATES PATENTS

| | | |
|---|---|---|
| 1,064,442 | Cadigan | June 10, 1913 |
| 1,133,682 | Trist | Mar. 30, 1915 |
| 1,389,056 | Lane | Aug. 30, 1921 |
| 1,533,128 | Meyers | Apr. 14, 1925 |
| 1,786,234 | Forman | Dec. 23, 1930 |
| 2,083,584 | Wineman | June 15, 1937 |
| 2,404,514 | McClure | July 23, 1946 |
| 2,597,134 | Stratton | May 20, 1952 |
| 2,645,449 | Gulick | July 14, 1953 |
| 2,685,296 | Boosman | Aug. 3, 1954 |
| 2,822,818 | Breznick | Feb. 11, 1958 |

FOREIGN PATENTS

| | | |
|---|---|---|
| 12,911 | Great Britain | June 7, 1904 |
| 726,507 | Great Britain | Mar. 16, 1955 |